United States Patent [19]

Etherington et al.

[11] Patent Number: 5,323,666
[45] Date of Patent: Jun. 28, 1994

[54] TRANSMISSION SYSTEM WITH PARALLEL INPUT AND CONCENTRIC OUTPUTS

[75] Inventors: Michael Etherington, Abingdon, Va.; Michael R. Long, Gainsborough, England

[73] Assignee: Dosco Overseas Engineering Ltd., Notts, England

[21] Appl. No.: 906,894

[22] Filed: Jun. 30, 1992

[30] Foreign Application Priority Data

Jan. 14, 1992 [GB] United Kingdom ............... 92000681

[51] Int. Cl.$^5$ .................... B60K 17/344; B60K 17/346
[52] U.S. Cl. ................. 74/665 GC; 180/248; 475/206
[58] Field of Search ............. 180/297, 371, 372, 373; 74/665 G, 665 F, 665 GC, 665 GA, 665 GB, 665 GE; 475/198, 202, 206, 210, 220, 225, 230, 248

[56] References Cited

U.S. PATENT DOCUMENTS

| | | | |
|---|---|---|---|
| 2,426,960 | 9/1947 | Wesselhoff | 474/112 |
| 2,595,494 | 5/1952 | Stratman | 74/665 GC X |
| 2,599,061 | 6/1952 | Lee | 414/528 |
| 2,654,347 | 10/1953 | Clark | 91/380 |
| 2,858,897 | 11/1958 | Sibley | 180/255 |
| 3,302,739 | 2/1967 | Beck et al. | 180/24 |
| 4,160,619 | 7/1979 | Nelson | 414/501 |
| 4,631,978 | 12/1986 | Teraoka | 74/665 GC X |
| 4,727,768 | 3/1988 | Hayashi et al. | 475/206 |
| 4,762,022 | 8/1988 | Johnson | 475/225 X |
| 5,078,229 | 1/1992 | Kikudi et al. | 180/248 |

FOREIGN PATENT DOCUMENTS

| | | |
|---|---|---|
| 666032 | 7/1963 | Canada ............... 180/12 |
| 0268904 | 6/1988 | European Pat. Off. . |
| 4027901 | 3/1991 | Fed. Rep. of Germany . |
| 2230512 | 12/1974 | France . |
| 355363 | 8/1961 | Switzerland . |

OTHER PUBLICATIONS

Eimco-Elkhorn Advertising Brochure (no date of publication).

*Primary Examiner*—Leslie A. Braun
*Assistant Examiner*—Khoi Ta
*Attorney, Agent, or Firm*—Webb, Ziesenheim, Bruening, Logsdon Orkin & Hanson

[57] ABSTRACT

A transmission system having a power input shaft for connection to a power source and two coaxial differentially driven outputs located substantially parallel to and spaced from the input shaft. The power input shaft is operatively connecting the driven outputs to simultaneously drive the driven outputs in response to rotation of the power input shaft.

4 Claims, 2 Drawing Sheets

TRANSMISSION SYSTEM WITH PARALLEL INPUT AND CONCENTRIC OUTPUTS

BACKGROUND OF THE INVENTION

1. Field of the Invention

This invention relates generally to a transmission system for automotive vehicles and more particularly to a transmission system for vehicles which are propelled by a pair of laterally spaced differentially driven wheels. The transmission system provides a substantially even distribution of torque and stress throughout the vehicle chassis.

SUMMARY OF THE INVENTION

The transmission system of the invention has a power input and two coaxial differentially driven power outputs disposed alongside the input. Preferably, the axis of the power input is substantially parallel to the common axis of the power outputs. The power input is coupled to the input of an interaxle differential which transfers power to the power outputs. This coupling may be achieved by intermeshing gears; by a sprocket and chain drive or by other well-known arrangements.

The transmission system is used in an automotive vehicle having a chassis, a motor mounted on one side of the longitudinal axis of the chassis and coupled to the power input of the transmission system which is mounted on the opposite side of the longitudinal axis of the chassis. Each wheel of a pair of laterally spaced wheels is coupled to a power output of the transmission. Preferably, each wheel is mounted on the free end of a trailing arm of a bell crank lever which is pivotally mounted on the vehicle chassis about an axis substantially parallel with the common axis of the power outputs. Each wheel may be coupled to its respective power output by a sprocket and chain drive.

A complete understanding of the invention will be obtained from the following description when taken in connection with the accompanying drawings wherein like reference characters identify like parts throughout.

DESCRIPTION OF THE PREFERRED EMBODIMENT

Figure 1:
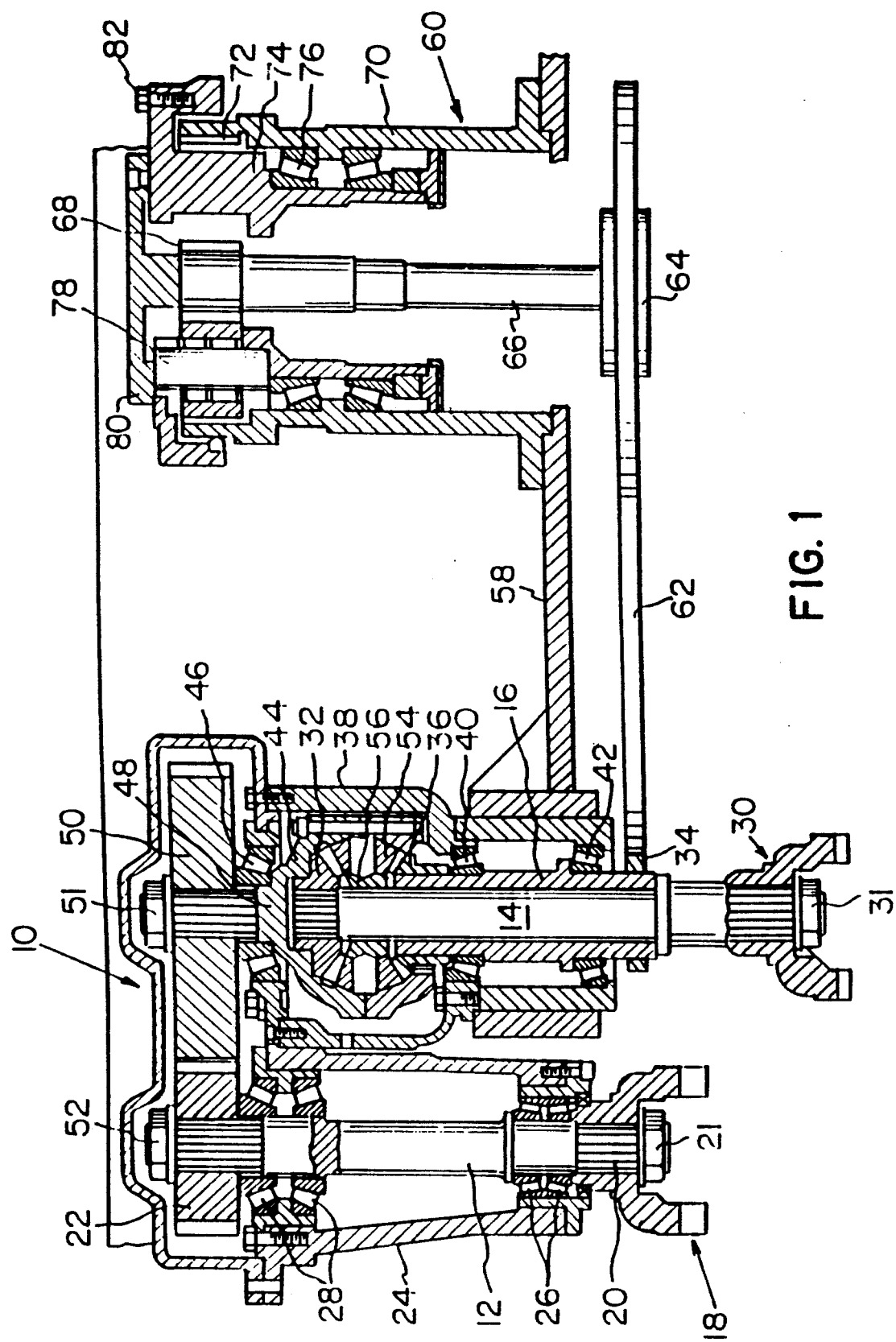
FIG. 1 is a partly schematic vertical section through a transmission system according to the invention.

As shown in FIG. 1 of the drawings, transmission system 10 includes a power input shaft 12 and two coaxial differentially driven outputs. The outputs are a shaft 14 and a sleeve 16 coaxial with and surrounding shaft 14. Outputs 14 and 16 are disposed beside power input shaft 12 so that their free ends are on the same side of the transmission system. The free end of power input shaft 12 is provided with a universal joint coupling 18 which is prevented from rotating relative to shaft 12 by splines 20 and is retained on shaft 12 by a nut and washer assembly 21. Power input shaft 12 carries a spur gear 22 at its other end, which is retained on the shaft by a nut and washer assembly similar to assembly 21. Shaft 12 is supported for rotation relative to a housing 24 by spaced roller bearing sets 26 and 28.

The free end of output shaft 14 is provided with a universal joint coupling 30 which is retained against rotation relative to the shaft by splines. A nut and a washer assembly 31 holds coupling 30 on the end of the shaft. The other end of output shaft 14 carries a bevel gear 32, which is retained against rotation by splines and a standard circlip (not shown).

The free end of output sleeve 16 has a sprocket 34 fixed thereto and the other end of the sleeve has a bevel gear 36 attached thereto. Sleeve 16 is supported for rotation relative to a housing 38 by spaced roller bearing sets 40 and 42. Roller bearing set 40 is remote from the free end of the output sleeve and retains bevel gear 36 in place axially along the sleeve. Roller bearing set 42 retains the sleeve coaxially within housing 38. The teeth of bevel gear 32 on output shaft 14 and the teeth of bevel gear 36 on output sleeve 16 face one another.

A cage 44 surrounds bevel gears 32 and 36 and is supported for rotation relative to output housing 38 by a roller bearing set 46 located at the end of shaft 14 removed from the free ends of output shaft 14 and sleeve 16. An intermediate input shaft 48 is integral with cage 44. Input shaft 48 carries a spur gear 50 at its free end which is retained against rotation by splines and is held in place by a nut and a washer assembly 51. Spur gear 50 meshes with spur gear 22 on the end of power input shaft 12. Spur gears 22 and 50 are enclosed within a gear housing 52.

An intermediate annulus 54 surrounds output shaft 14 between bevel gears 32 and 36 and is rotatable relative thereto. Two intermediate bevel gears 56 are located between intermediate annulus 54 and cage 44. The intermediate bevel gears 56 are rotatable relative to cage 44 and intermediate annulus 54 about axes of rotation perpendicular to that of cage 44 and intermediate annulus 54. Intermediate bevel gears 56 simultaneously mesh with both output bevel gears 32 and 36.

It will be recognized by one skilled in the art that the combination of housing 38, intermediate input shaft 48, cage 44, intermediate annulus 54, intermediate bevel gears 56, output bevel gears 32 and 36, output shaft 14 and sleeve 16 is an interaxle differential. The operation of the differential permits output sleeve 16 to be differentially driven by power input shaft 12.

An advantage obtained by the transmission system described above is that, when the power input shaft is coupled to a power unit, such as a motor, the drive from the transmission system to the vehicle wheels, i.e., from the pair of driven outputs 14 and 16, is located between the transmission system and the power unit. Accordingly, the maximum dimension of the combination of the power unit and the transmission system is the distance between the power unit and the transmission system. This represents a space saving as opposed to an arrangement wherein a power unit is directly coupled to an intermediate input shaft. However, this combination of the power unit and the transmission system still possesses the advantages associated with a transversely mounted power unit, since no torque is developed about the longitudinal axis of the chassis which would create the same effect on the chassis as unbalanced torque.

In addition, since the drive from the transmission system to the vehicle wheels is located on the vehicle chassis between the power unit and the transmission system, the mechanism coupling the drive to the vehicle wheels can be located toward the longitudinal center of the vehicle, or symmetrically on either side of the vehicle while maintaining the weight of the power unit and of the transmission system on opposite sides of the vehicle. The symmetry of the coupling mechanism from the transmission system to the vehicle wheels, with respect to the center line of the vehicle, means that stresses generated thereby are symmetrically distributed throughout the vehicle chassis.

As indicated above, the invention provides a transmission system which, when incorporated in a vehicle, provides an even torque and stress distribution on the vehicle chassis.

FIG. 1 of the drawings also shows a trailing arm 58 mounted to pivot about the axis of rotation of transmission outputs 14 and 16. An epicyclic hub 60 is attached to the free end of trailing arm 58. The operation of the hub is described hereinafter. A drive chain 62 extends parallel to trailing arm 58 and couples sprocket 34 on output sleeve 16 to a wheel drive sprocket 64 connected to epicyclic hub 60.

Drive sprocket 64 is attached to the free end of a central spindle 66 of hub 60, and the other end of spindle 66 carries a sun gear 68. The hub includes an annular casing 70 which is fixed to trailing arm 58 and is provided with an annular rack 72 on the inner circumference corresponding to the position of sun gear 68.

An annular planetary gear carrier 74 is located between central spindle 66 and annular casing 70. Planetary gear carrier 74 is retained within casing 70 and is supported for rotation relative to casing 70 by spaced roller bearing sets 76. The planetary gear carrier carries three planetary gears 78 which simultaneously mesh with sun gear 68 and with rack 72. An end cap 80 is bolted to the outermost end of planetary gear carrier 74.

Rotation of sun gear 68 causes the three planetary gears to rotate about their individual axes in the direction opposite to the direction of rotation of the sun gear. This in turn causes the three planetary gears to advance around annular rack 72 in the same direction as the direction of rotation of sun gear 68 moving planetary gear carrier 74 and end cap 80 with them. A wheel (not shown in FIG. 1 of the drawings) is bolted by studs 82 to planetary gear carrier 74. It will be understood that epicyclic hub 60 functions as a reduction gear.

Figure 2:
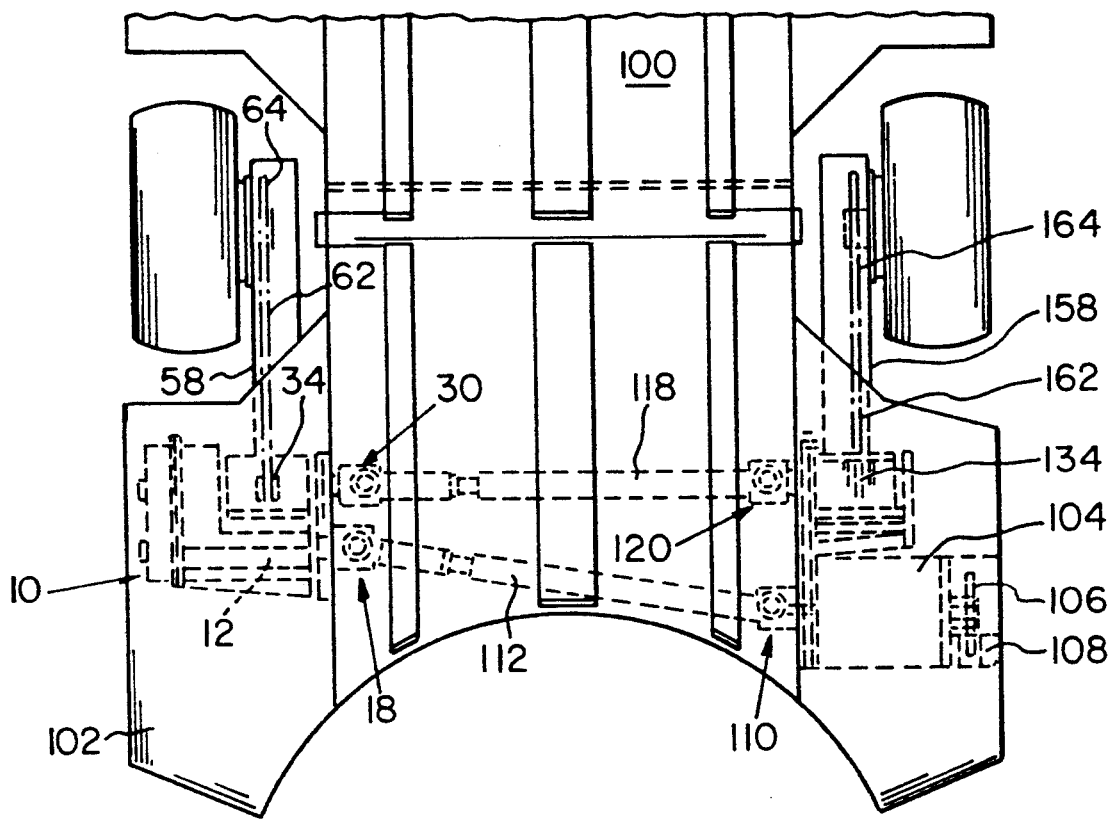
FIG. 2 is a schematic plan view of a vehicle chassis including a pair of wheels and a transmission system according to the invention.

FIG. 2 of the drawings shows a portion of a vehicle 100 having a transmission system according to the invention. The vehicle is a section of a multi-section articulated mine shuttlecar which is the subject, of our U.S. patent application Ser. No. 07/906,569 filed contemporaneously herewith. The specific structure of the vehicle forms no part of the instant invention. Vehicle 100 includes a chassis 102 having a motor 104 mounted on the underside thereof. The motor is preferably a DC variable speed double-ended electric motor, one end of which carries a spring actuated disc 106 of a hydraulically released disc brake 108. The other end of motor 104 is connected with a drive shaft 112 through a universal joint 110. Drive shaft 112 is connected through universal joint coupling 18 with power input shaft 12 of transmission system 10 which is mounted on the underside of vehicle chassis 102 opposite of motor 104. The operation of transmission system 10 is described with reference to FIG. 1 of the drawings and includes drive chain 62 between output sleeve sprocket 34 and wheel sprocket 64. An equivalent arrangement is provided for output shaft 14, which is connected by universal joint coupling 30, a second shaft 118, and a further universal joint coupling 120 to an output shaft sprocket 134. This sprocket drives a chain 162 and a wheel sprocket 164 on a trailing arm 158.

It will be appreciated that the torque developed by motor 104 substantially matches the torque created by transmission system 10 and that, therefore, the drive stresses for the two wheels are symmetrically distributed. The transmission system is compact in the transverse direction when space is at a premium.

It will be understood by those skilled in the art that the above description is exemplary and that certain modifications may be made thereto without departing from the scope of the invention. For example, instead of using chain drives and sprockets 34, 62, 64 and 134, 162, 164, intermeshing pinion gear drives or shaft drives can be used.

While a specific embodiment of the invention has been described in detail herein, it will be appreciated by those skilled in the art that various modifications and alternatives to this embodiment could be developed in light of the overall teachings of the disclosure. Accordingly, the particular arrangement is illustrative only and is not limiting as to the scope of the invention which is to be given the full breadth of the appended claims and any and all equivalents thereof.

We claim:

1. A transmission system having a power input shaft adapted to be connected to a power source, a coupling on one end of said power input shaft to rotate said power input shaft, a differentially driven output shaft and a differentially driven output sleeve surrounding a longitudinal portion of said differentially driven output shaft located substantially parallel to and spaced from said power input shaft, a coupling on one end of said differentially driven output shaft and a sprocket on one end of said differentially driven output sleeve, and means operatively connecting said power input shaft to said differentially driven output shaft and to said differentially driven sleeve for driving said differentially driven output shaft and said differentially driven output sleeve in response to rotation of said power input shaft.

2. A transmission system as set forth in claim 1 wherein said means operatively connecting said power input shaft to said differentially driven output shaft and said differentially driven output sleeve includes a spur gear on one end of said power input shaft, an interaxle differential for said differentially driven output shaft and said differentially driven output sleeve and a spur gear on an input end of said interaxle differential, whereby said spur gear on said one end of said power input shaft drives said spur gear on said input end of said interaxle differential to rotate said differentially driven output shaft and said differentially driven output sleeve.

3. A transaxle transmission system for connecting a pair of wheels on a vehicle having the same axis of rotation, said system including a power input shaft, a coupling on one end of said power input shaft adapted to be connected to a power source to rotate said power input shaft, a differentially driven output shaft and a differentially driven output sleeve coaxial with said differentially driven output shaft and surrounding a longitudinal portion of said differentially driven output shaft located substantially parallel to and spaced from said power input shaft, a coupling on one end of said differentially driven output shaft and a sprocket on one end of said differentially driven output sleeve, and means operatively connecting said power input shaft to said differentially driven output shaft and to said differentially driven sleeve for driving said differentially driven output shaft and said differentially driven output sleeve in response to rotation of said power input shaft.

4. A transmission system as set forth in claim 3 wherein said means operatively connecting said power input shaft to said differentially driven output shaft and said differentially driven output sleeve includes a spur gear on one end of said power input shaft, an interaxle differential for said differentially driven output shaft and said differentially driven output sleeve and a spur gear on an input end of said interaxle differential, whereby said spur gear on said one end of said power input shaft drives said spur gear on said input end of said interaxle differential to rotate said differentially driven output shaft and said differentially driven output sleeve.

* * * * *